(12) United States Patent
Bishop

(10) Patent No.: US 8,224,387 B2
(45) Date of Patent: Jul. 17, 2012

(54) BEAMFORMING SYSTEM AND METHOD

(75) Inventor: Andrew Mark Bishop, Stevenage (GB)

(73) Assignee: Astrium Limited, Hertfordshire (GB)

( * ) Notice: Subject to any disclaimer, the term of this patent is extended or adjusted under 35 U.S.C. 154(b) by 797 days.

(21) Appl. No.: 12/158,278

(22) PCT Filed: Dec. 17, 2007

(86) PCT No.: PCT/GB2007/050763
§ 371 (c)(1),
(2), (4) Date: Jun. 19, 2008

(87) PCT Pub. No.: WO2008/075099
PCT Pub. Date: Jun. 26, 2008

(65) Prior Publication Data
US 2008/0268775 A1    Oct. 30, 2008

(30) Foreign Application Priority Data

Dec. 20, 2006  (EP) ..................................... 06270108
Dec. 20, 2006  (GB) ..................................... 0625363.7

(51) Int. Cl.
| | |
|---|---|
| H04M 1/00 | (2006.01) |
| H04B 1/38 | (2006.01) |
| H04B 1/06 | (2006.01) |
| H04B 7/00 | (2006.01) |
| H04B 7/10 | (2006.01) |
| H04B 1/02 | (2006.01) |
| H04K 1/10 | (2006.01) |
| H04L 27/06 | (2006.01) |
| H04L 25/49 | (2006.01) |

(52) U.S. Cl. .................. 455/562.1; 455/277.1; 455/101; 455/560; 455/561; 455/273; 455/276.1; 375/360; 375/340; 375/295; 375/347; 375/219; 375/220; 375/221; 375/222; 375/223

(58) Field of Classification Search ............... 455/562.1, 455/277.1, 101, 560, 561, 273, 276.1; 375/260, 375/340, 295, 347, 219–223
See application file for complete search history.

(56) References Cited

U.S. PATENT DOCUMENTS 5,218,619 A * 6/1993 Dent .............................. 370/209
(Continued)

FOREIGN PATENT DOCUMENTS

EP        1 732 245 A2    12/2006
(Continued)

OTHER PUBLICATIONS

UK Intellectual Property Office, Search Report under Section 17 for GB Application No. 0625363.7, Mar. 14, 2007, 1 page.
(Continued)

*Primary Examiner* — Bobbak Safaipour
(74) *Attorney, Agent, or Firm* — Pearl Cohen Zedek Latzer, LLP

(57) ABSTRACT

A beamforming system that can be used for both receive and transmit beamforming is provided. The system receives samples of a number of signals, each sample containing a band of frequencies and routes all sampled signals associated with the same beamformed frequency band to a predetermined processing block. A predetermined number of the routed sampled signals are selected sequentially according to predetermined criteria, weighted and accumulated to form a composite signal. Individual signals are then selected from the composite signal and routed to an appropriate output. The system uses a much smaller number of weighting functions than conventionally required, with processing for a single frequency being performed in the same processing block. This reduces the complexity of beamforming processing substantially and simplifies frequency reuse. In addition a single DSP design that works for both transmit and receive beamforming can be implemented.

26 Claims, 9 Drawing Sheets

U.S. PATENT DOCUMENTS

| | | | |
|---|---|---|---|
| 5,274,386 A * | 12/1993 | Pellon | 342/380 |
| 5,621,752 A * | 4/1997 | Antonio et al. | 375/144 |
| 6,336,030 B2 * | 1/2002 | Houston et al. | 455/13.2 |
| 6,549,527 B1 * | 4/2003 | Tsutsui et al. | 370/342 |
| 6,763,062 B1 * | 7/2004 | Kohno et al. | 375/220 |
| 7,103,383 B2 * | 9/2006 | Ito | 455/562.1 |
| 7,260,141 B2 * | 8/2007 | Bierly et al. | 375/222 |
| 7,526,321 B2 * | 4/2009 | Liu | 455/562.1 |
| 7,539,273 B2 * | 5/2009 | Struckman | 375/341 |
| 2002/0141478 A1 * | 10/2002 | Ozluturk et al. | 375/130 |
| 2007/0189404 A1 * | 8/2007 | Baum et al. | 375/260 |
| 2008/0049851 A1 * | 2/2008 | Nangia et al. | 375/260 |
| 2010/0020907 A1 * | 1/2010 | Rezvani et al. | 375/347 |
| 2010/0099366 A1 * | 4/2010 | Sugar et al. | 455/75 |

FOREIGN PATENT DOCUMENTS

| | | |
|---|---|---|
| GB | 2 318 947 A | 5/1998 |
| WO | WO 98/27669 | 6/1998 |
| WO | WO 2005/114868 A1 | 12/2005 |

OTHER PUBLICATIONS

PCT International Search Report, International Application No. PCT/GB2007/050763, Mar. 17, 2008, pp. 1-3.

European Patent Office, European Search Report, EP Application No. 06 27 0108, May 22, 2007, pp. 1-2.

* cited by examiner

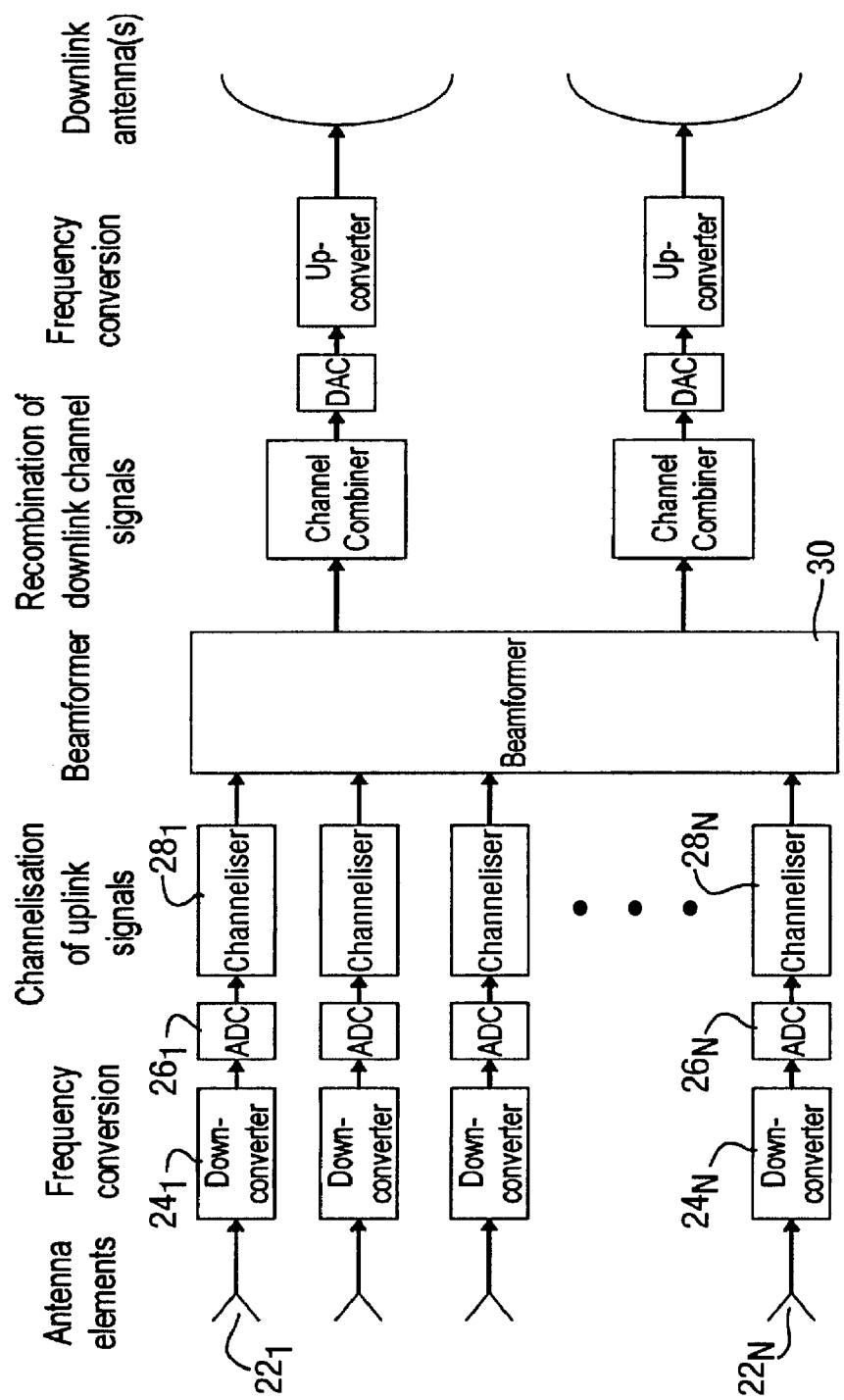

BEAMFORMING SYSTEM AND METHOD

CROSS-REFERENCE TO RELATED APPLICATIONS

This application is a national phase application of PCT/GB2007/050763 filed on Dec. 17, 2007, which in turn claims priority from GB Application no. 0625363.7, filed on Dec. 20, 2006, and EP Application No. 06270108.1, filed on Dec. 20, 2006, each of which are incorporated by reference herein in their entirety.

The invention relates to beamforming techniques, and in particular, to beamforming techniques for use in satellite communications systems. Various communication systems, such as mobile telephones, cable TV, internet and military communications etc., make use of satellites orbiting the Earth to transfer signals. A satellite uplink communications signal is transmitted to the satellite from one or more ground stations, and is then retransmitted by the satellite to another satellite or to Earth as a downlink communications signal to cover a desirable reception area depending on the particular use. The uplink and downlink signals are typically transmitted at different frequencies.

Satellite communication systems may incorporate multi-beam array antennas using beamforming techniques. Such array antennas are very useful in forming multiple simultaneous beams covering a large field of view. Receive beam-forming is a process by which received signals from several different antenna elements are combined in a way that accentuates desired signals and attenuates, or reduces, undesirable signals. As shown in FIG. 1a, the input signals from the antenna elements 1 . . . n (four are shown) to the receive beam-former each comprise a stream of values which are combined by applying a series of weighting coefficients w1 . . . wn which results in each beamformer output producing a signal representative of a potentially different vector combination of the input signals. By adjusting the set of weighting coefficients w1 . . . wn applied to the input signals, the beam-former can dynamically change the direction and content for any or all of the beams created by the antenna array. Because of the directional nature of the output beams, a large number of spatially distinct beams from a set of receive antenna elements may reuse the same frequency spectrum. Thus, beam-forming techniques allow a substantial increase in the number of users that may be supported over a given service area by a given satellite.

Similarly, as illustrated in FIG. 1b, transmit beamforming involves the application of weighting coefficients w1 . . . wn to the transmit signal for each element 1 . . . n of the antenna array so as to control the direction and content of any or all of the beams transmitted by the antenna array.

The weighting coefficients can be based on any of a variety of known techniques used for beam formation and can be applied to incoming signals using any suitable analogue or digital means. An analogue RF beamforming system adjusts the phases and/or amplitudes of signals at the RF or intermediate frequency ("IF") stage of the transmitter and/or receiver chain associated with the antenna, whereas a digital beamforming system adjusts the phases and/or amplitudes of signals digitally. In digital beamforming receivers, signals are processed after analogue-to-digital conversion. In digital beamforming transmitters, signals are processed prior to digital-to-analogue conversion. Digital beamforming is particularly advantageous because of the ease with which digital signals and processing can be replicated and the predictable and stable nature of digital implementations of the beam-forming signal weighting operation.

In satellite communication systems there is a continuing effort to reduce overall system complexity and to increase efficiency. The antenna arrays used in such systems typically comprise hundreds of individual array elements and because conventional beamforming techniques involve the application of different weighting functions to the signals routed to, or received from, every element of the array, the complexity of the processing requirements involved increases proportionately to the size of the array.

In many array systems, most of the beams formed do not use all of the elements of the antenna array due to the nature of the antenna system. With an array fed reflector (AFR) antenna, the feed array is not directed at the target beam location but beams are formed after reflecting the signals from a large antenna. The effect of the large reflector is to magnify the apparent size of the feed array to improve the spatial resolution of the beamforming process. In some configurations this will mean that each of the individual elements in the array contributes to a fraction of the overall coverage area of the antenna system. In such systems, although unused array elements are typically assigned a zero weighting function in the beam-forming processing, the system architecture is arranged to receive and process inputs from each individual element beam of the array. Hence, despite the redundancy of many array elements, such systems remain unnecessarily complex.

It is known to divide the array into pre-determined sub-arrays to combine a number of physical antenna elements using analogue methods so that the number of inputs to the digital processor is reduced. This has the advantage of increasing the number of antenna elements for the same number of digital processor inputs or reducing the number of digital processor inputs for the same number of elements.

Typically receive and transmit beamforming are carried out separately, usually by operating the same functional block in reverse (i.e. make all of the signal flow bi-directional and choose one direction or the other depending on the mode). It has been recognized that it would be advantageous to provide a beamformer block that is uni-directional in itself but which can perform either receive or transmit beamforming with minimal adaptation required.

It is an object of the present invention to reduce the complexity and processing requirements associated with beam-forming techniques used in a satellite communications system.

It is a further object of the present invention to improve the efficiency of beamforming architectures used in active antenna systems where not all antenna elements contribute to each beam.

It is yet a further object of the present invention to provide a single DSP design that works for both transmit and receive beamforming.

From a first aspect, the present invention resides in a beam-forming system comprising uplink signal channelisation means; beamforming means adapted to process both transmit and receive uplink channel signals; and means for recombination of downlink channel signals. Since an identical beam-forming system can be used for both receive and transmit beamforming where the same input and output interfaces are present and where the same dataflow exists, it is possible to implement a single DSP design that works for both transmit and receive beamforming. The number of inputs and outputs will depend on the type of beamforming (receive or transmit) but the structure of the DSP is identical. Hence, a single piece of DSP equipment can be used for either type of beamforming by changing only the number of inputs and outputs (or by activating the required number of inputs and outputs from a larger set).

From a second aspect the present invention resides in a beamforming system comprising input means for receiving samples of a number of signals, each sample containing a band of frequencies; switching means for routing all sampled signals associated with the same beamformed frequency band to a predetermined processing block; means for sequentially selecting a predetermined number of routed sampled signals according to predetermined criteria; weighting means for applying a predetermined fixed number of weighting coefficients to the selected signals; means for accumulating the weighted signals to form a composite signal; and means for selecting signals from the composite signal and routing to an appropriate output.

The system may be used for receive beamforming where the received samples comprise composite signals from a number of beams received by each of a number of antenna elements and where the routed signals are selected according to the beam to which they contribute. Alternatively, the beamforming system may be used for transmit beamforming where the received samples comprise signals from a number of beams to be transmitted by each of a number of antenna elements and where the routed signals are selected according to the antenna element by which they will be transmitted.

The beamforming technique of the present invention is advantageous in that the separate different weighting function conventionally required for each individual element of the antenna array is replaced by a switching function adapted to select only those signals contributing to each beam or to the signal to be transmitted by each element. A much smaller fixed number of weighting functions are then applied to the selected signals with processing for a single frequency for all of the elements being performed in the same processing block. This reduces the complexity of beamforming processing substantially and simplifies frequency reuse. The use of much more efficient algorithms is also facilitated. In addition, the incorporation of switching functionality facilitates full flexibility for selection of any subset of antenna elements of the array for subsequent beamforming processing.

The present invention also resides in a method of beamforming comprising the steps of (a) receiving samples of a number of signals, each sample containing a band of frequencies; (b) routing all sampled signals associated with the same beamformed frequency band to a predetermined processing block; (c) selecting sequentially a predetermined number of routed sampled signals according to predetermined criteria; (d) applying a predetermined fixed number of weighting coefficients to the selected signals; (e) accumulating the weighted signals to form a composite signal; repeating steps (c) to (e) a predetermined number of times; and (f) selecting signals from the composite signal and routing to an appropriate output. The method may be used for receive beamforming where step (a) comprises receiving samples of composite signals from a number of beams received by each of a number of antenna elements and where step (c) comprises selecting signals according to the beam to which they contribute. Alternatively, the method may be used for transmit beamforming, where step (a) comprises receiving samples of signals from a number of beams to be transmitted by each of a number of antenna elements and where step (c) comprises selecting signals according to the antenna element by which they will be transmitted.

The invention also resides in a receive beamforming system comprising input means for receiving samples of composite signals from a number of beams received by each of a number of antenna elements, each sample containing a band of frequencies; switching means for routing all sampled signals associated with the same beamformed frequency band to a predetermined processing block; means for sequentially selecting a predetermined number of routed sampled signals according to the beam to which they contribute; weighting means for applying a predetermined fixed number of weighting coefficients to the selected signals; means for accumulating the weighted signals to form a composite signal; and means for selecting signals from the composite signal and routing to an appropriate output.

From a further aspect, the invention resides in a transmit beamforming system comprising input means for receiving samples of signals from a number of beams to be transmitted by each of a number of antenna elements, each sample containing a band of frequencies; switching means for routing all sampled signals associated with the same beamformed frequency band to a predetermined processing block; means for sequentially selecting a predetermined number of routed sampled signals according to the antenna element by which they will be transmitted; weighting means for applying a predetermined fixed number of weighting coefficients to the selected signals; means for accumulating the weighted signals to form a composite signal; and means for selecting signals from the composite signal and routing to an appropriate output.

Embodiments of the present invention will now be described by way of example with reference to the accompanying drawings in which:—

FIG. 2 is a block diagram representation of a receiver system for use in a satellite, according to the invention;

Figure 1A:
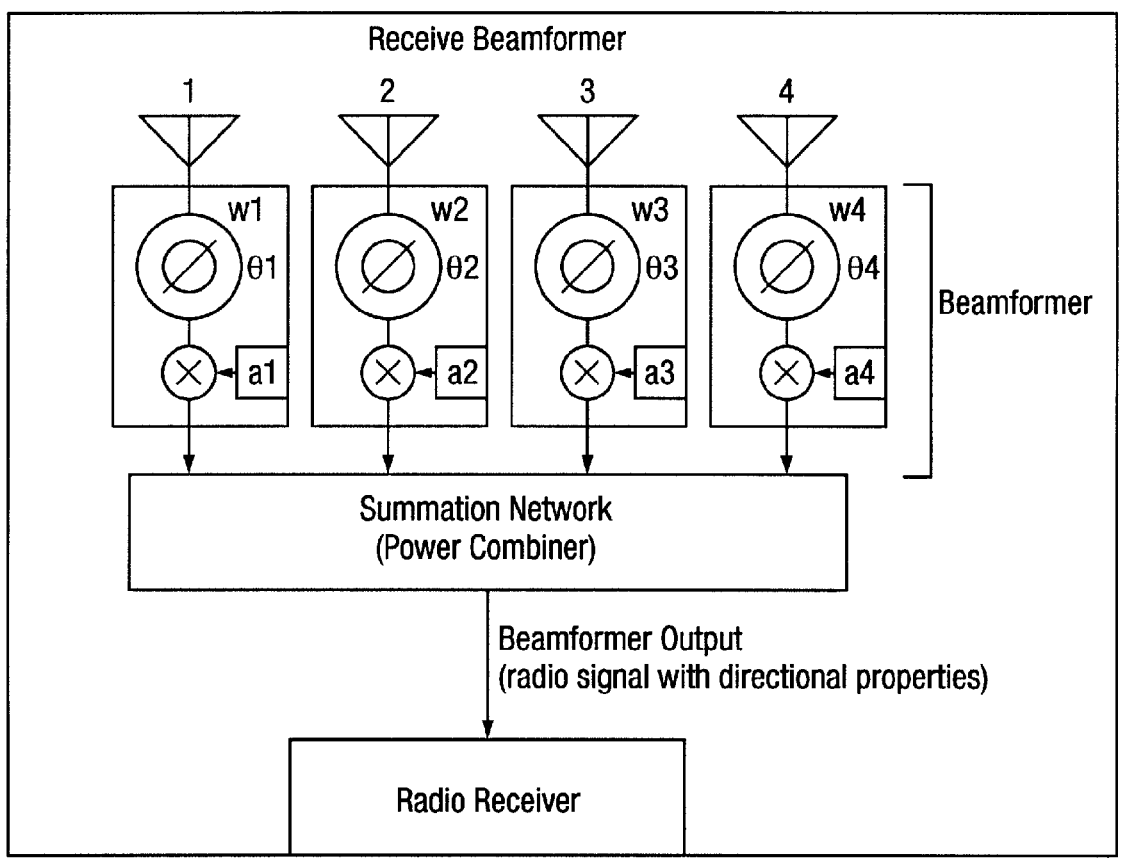
FIGS. 1a and 1b are simplified representations of known receive and transmit beamforming systems.
Figure 1B:
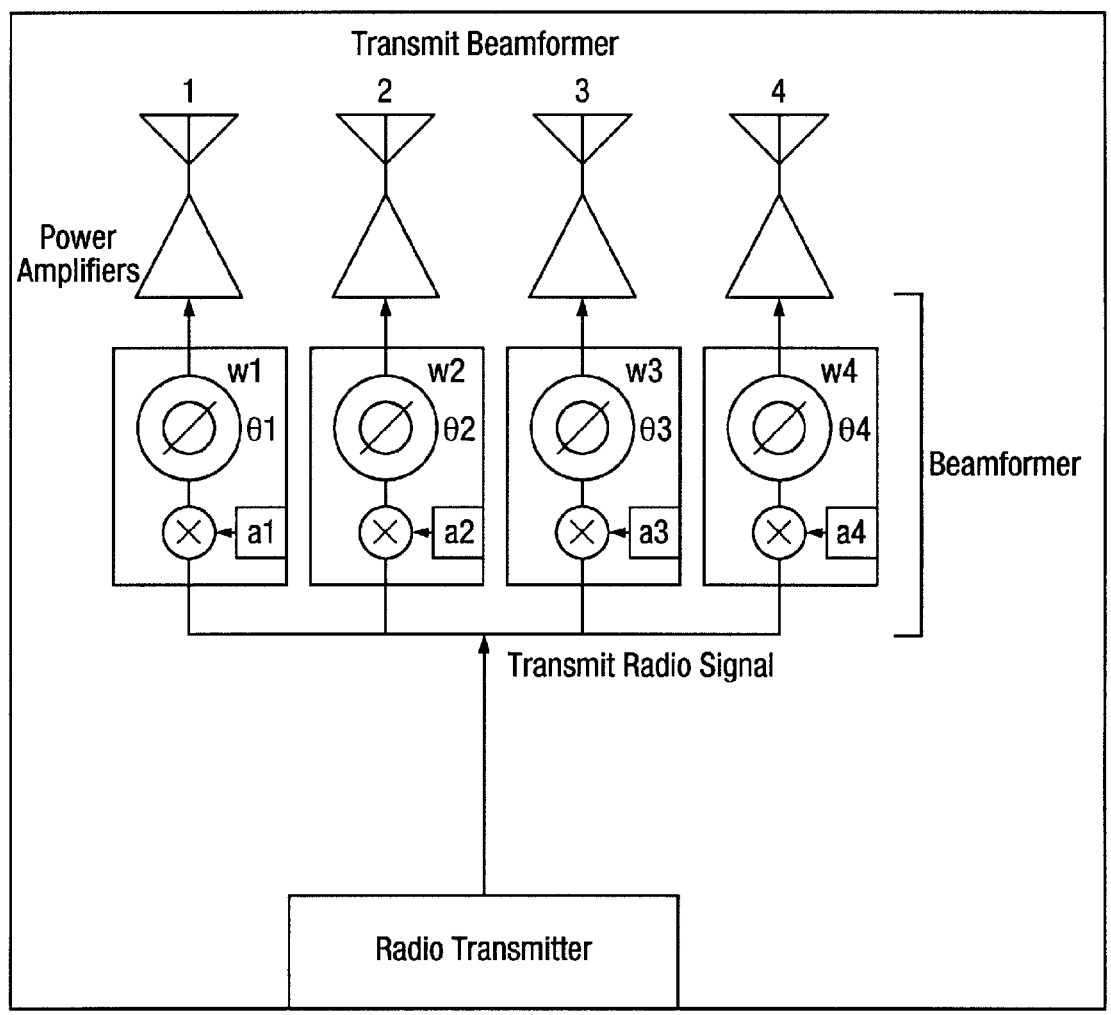
Figure 3:
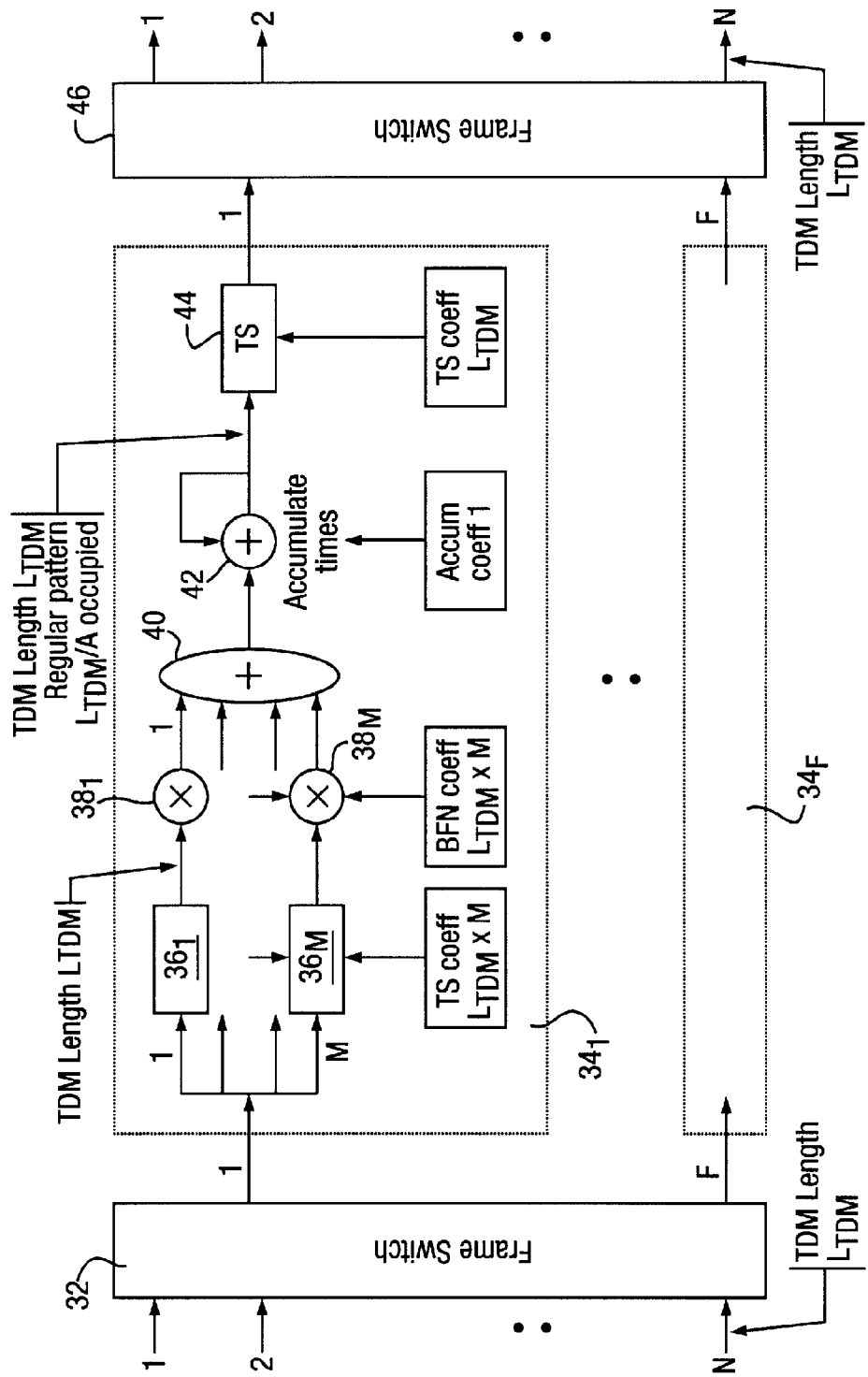
FIG. 3 is a block diagram representation of a preferred embodiment of the digital receive beamforming system illustrated in FIG. 2.
Figure 7:
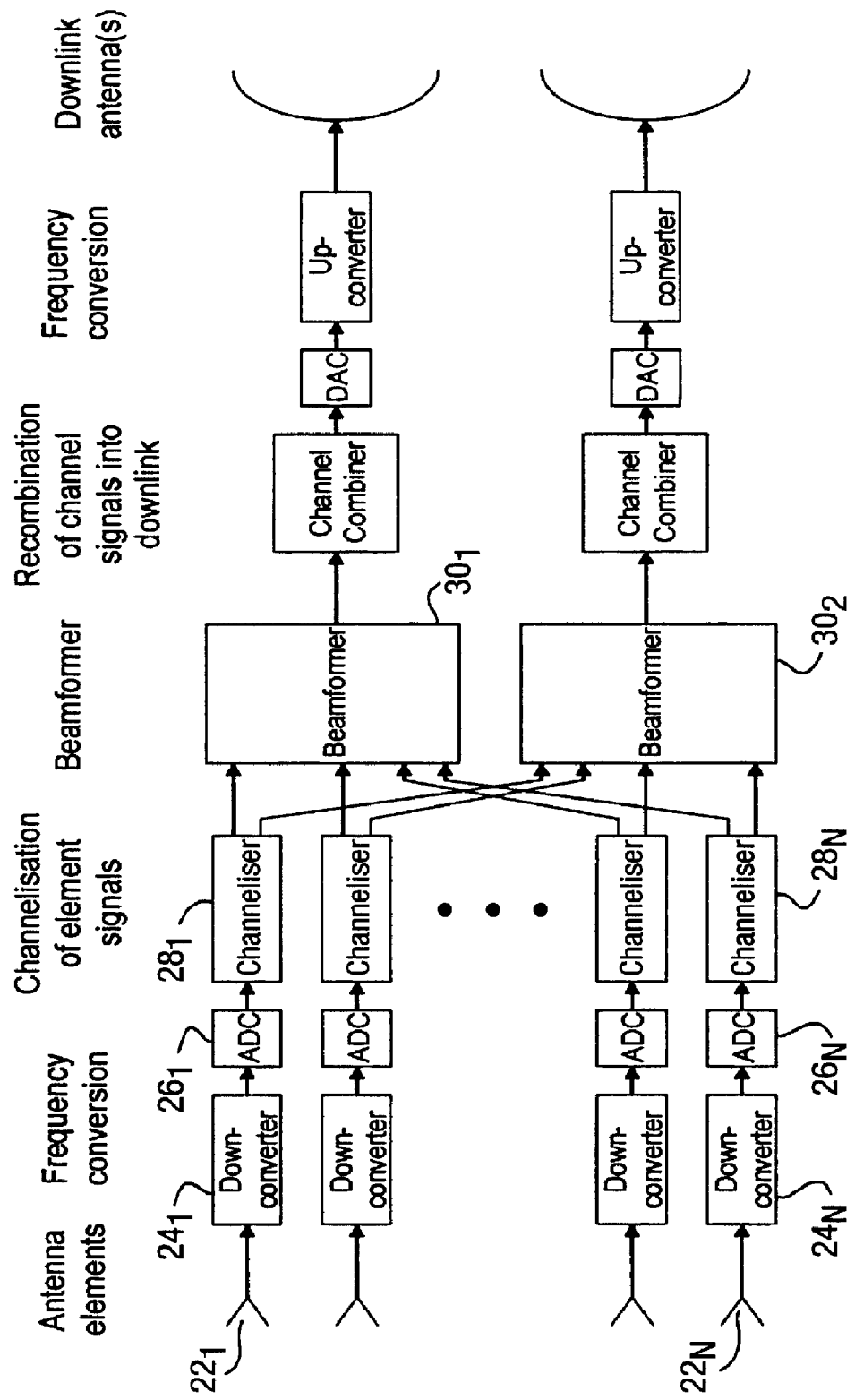
Figure 8:
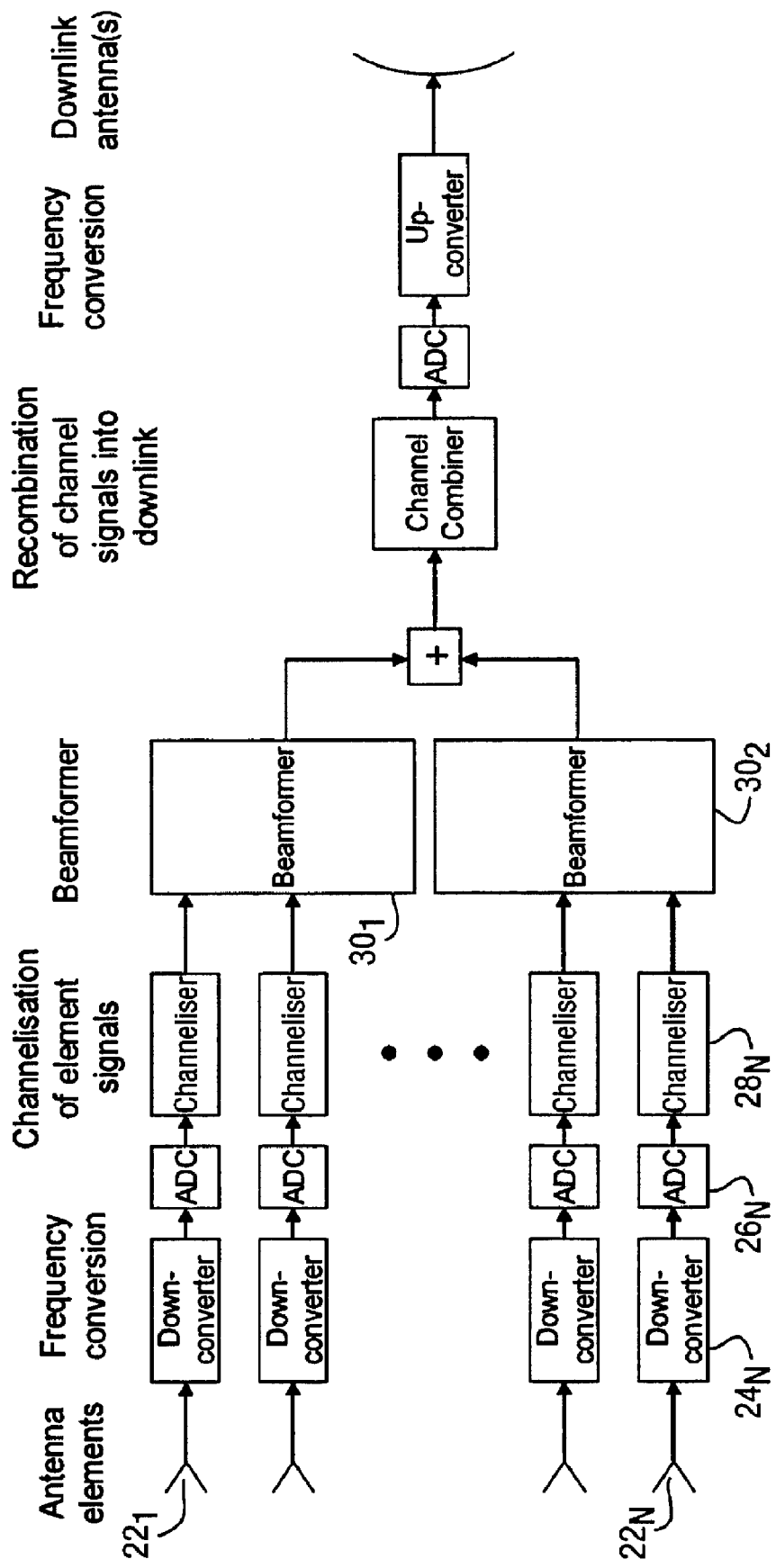

FIG. 7 is a block diagram representation of a further embodiment of the invention comprising a number of receive beamforming systems, each of the type shown in FIG. 3, but with the complete set of core processor functions not being combined within the same input and output frame switches; and FIG. 8 is a block diagram representation of a further embodiment of the invention comprising a number of receive beamforming systems, each beamforming system being used to process signals associated with a subset of a number of antenna elements.

The following discussion of the embodiments of the invention directed to a satellite antenna system is in no way intended to limit the invention, its applications or uses.

FIG. 2 shows a block diagram of a receiver system 20 of a satellite according to a preferred embodiment of the invention. Although the block diagram will be described in reference to a satellite, the system is also applicable to the receiver of a base station or radar system. As shown in FIG. 2, RF front end comprises N antenna elements $22_1 \ldots 22_N$, arranged to receive transmitted RF signals, each element coupled to a low noise amplifier (LNA) (not shown) as is well known, where the received RF signal is amplified. Each amplified element signal is fed to a down conversion mixer 24 where conversion to an intermediate frequency (IF) is performed using respective signals from a local oscillator (not shown). The IF signal is then converted into a digital signal by A/D converter 26 and fed into a digital channeliser 28.

The digital channeliser 28 implements a channel filter bank to separate the down-converted composite digital signal containing the individual signals from each element of the antenna array into a predetermined number, N, of digital channel signals. The digital channeliser 28 may be regarded as a bank of analysis digital filters with each filter having a predetermined bandwidth. The digital channeliser 28 comprises a set of convolutional digital filters and a Fast Fourier Transform (FFT) processor. The convolutional digital filters make use of multirate digital filter techniques, such as overlap and add, or polyphase, to efficiently implement a digital filter bank by grouping samples of the downconverted signal together, multiplying the sample groups by a convolutional function, and then forwarding the samples to the FFT for conversion into the N individual channel signals. However, it should be understood that the filter bank may be implemented using any of several different techniques.

Hence, the channeliser 28 serves to separate the input bandwidth which contains individual IF signals independent of each other in frequency, phase and electrical amplitude into multiple time-concurrent frequency output channels. In other words, the channeliser frequency-segments or sort-selects the various frequencies within the composite IF bandwidth into fixed channel widths or bins in frequency, which are numbered 1 to N. It should be understood that the channeliser may also operate directly on the RF input bandwidth, conversion to IF not being necessary for this process.

The N inputs to a beamformer 30 from the channeliser 28 may be considered in this embodiment to be a time division multiplex (TDM) of samples. A TDM in this context means that the individual data signals are sent sequentially in time along the same signal path so that one signal path can be shared between multiple signals. Hence, each TDM contains the samples from one of the antenna elements $22_1 \ldots 22_N$, for a number of frequencies and the timing of the samples in the various TDMs on the input are selected so that the same frequency band or the same element $22_1 \ldots 22_N$, does not appear in more than one input at the same time. However, it should be understood that a TDM implementation is not a necessity and various other transmission schemes are contemplated.

The configuration and operation of the beamformer component 30 of FIG. 2 will now be described with reference to FIG. 3. The beamformer 30 comprises an input frame switch 32 that receives N input signals corresponding to N different antenna elements $22_1 \ldots 22_N$. The different frequencies within the received element signals are present at different times during the TDM frame period $L_{TDM}$ across the complete set of inputs, all signals at a single time having different frequencies. The input frame switch 32 routes the signals from the array elements $22_1 \ldots 22_N$ so that signals of the same beamformed frequency from all antenna elements $22_1 \ldots 22_N$ are directed to a particular one of a number of F core processing blocks $34_1 \ldots 34_F$. It should be understood that by frequency here is meant a single frequency band from the channeliser 28. Each TDM sample input to the input frame switch 32 is subjected to a different switching function and a signal from up to F of the N inputs will be routed each to a different core processor $34_1 \ldots 34_F$ at each sample time. At some sample times the number of inputs that are routed can be less than F, but never more than F. When F<N, not all channels are switched as not every frequency is used for beamforming. If every frequency is used in the beamforming, then F must be at least N. The switching operation repeats on each frame so that the same switching function is applied to the same time slot in every frame. For each time slot in the TDM frame, each output signal is a copy of one of the signals that are present on one of the N inputs.

Within each core processing block $34_1 \ldots 34_F$, each routed signal sample at the particular frequency handled by that processing block is replicated into a number of TDM signals routed to time switches $36_1 \ldots 36_M$, where the number of switches M is a predetermined parameter depending on the number of elements $22_1 \ldots 22_N$ being beamformed and the number of elements used for each beam, on average. The function of the time switches $36_1 \ldots 36_M$ is to allow the signals output by the frame switch 32 to be re-ordered into any time slot order that is required for the subsequent processing and to allow duplication of input samples at different times. Each of the time switches $36_1 \ldots 36_M$ stores the entire contents of the input TDM frame in a table. Data is then read out of the table at a programmed time to perform the time reordering that is required.

Beamforming is performed on each of the frequency bands individually as will be described below and is achieved by selecting items from this table sequentially in a programmable order so that all of the individual elements $22_1 \ldots 22_N$ that contribute to a particular beam are selected and processed as will be described. Since the total set of beams that are formed for a single frequency is likely to use all of the antenna elements $22_1 \ldots 22_N$, it is necessary that all of the element signals for this single frequency are processed together so that all required combinations of elements can be formed.

Firstly, all of the element signals for the first beam are selected sequentially, M at a time, over each TDM frame slot $L_{TDM}$ so as to provide sufficient data to form the first beam. The outputs of the time switches $36_1 \ldots 36_M$ for the first beam are fed to a set of multipliers $38_1 \ldots 38_M$, where a programmable weighting coefficient is applied to each signal. The time switches $36_1 \ldots 36_M$ for the first beam select samples independently, so the signal on each multiplier $38_1 \ldots 38_M$ at a particular time is not replicated. As described earlier, each weighting coefficient applies an appropriate phase and amplitude weight to the signal and by adjusting the set of weighting coefficients applied to each M input signal, the direction and content of the output beams can be dynamically varied. The outputs of the multipliers $38_1 \ldots 38_M$, within the core processor $34_1 \ldots 34_F$ are then summed together in an adder 40 to form a single value for each sample in the TDM.

Next, all of the element signals for the second beam are selected sequentially by the time switches $36_1 \ldots 36_M$ and, as they are selected, they are weighted and the result for the second beam is summed together to be output after the signal for the last element 22 contributing to the beam has been added. This process is repeated for the total number of beams to be formed.

If the number of element signals required to form a beam is more than the number of multiplication operations M performed on each TDM frame slot $L_{TDM}$, then a further stage of accumulation in accumulator 42 is performed. This accumulation occurs over successive periods of A time slots of each frame so that a total M×A signal samples are selected and weighted element signals are accumulated. This value of A is programmable and depends on the number of elemental signals required to form a beam. This value of A can be determined dynamically according to traffic to some extent. A large number of samples will reduce the number of different outputs that can be formed since the total TDM frame length is fixed. Variation of the value of A does not change the amount of hardware required whereas varying the value of M involves changing the number of time switches and multipliers required.

When sufficient elemental signal samples M*A to form a beam with the desired characteristics have been weighted, the resultant summation is passed to an output time switch 44 that is arranged to reorder the beam signals within the TDM. The main purpose of this output time switch 44 is to select only the useful signals from the multiplication/summation function and to output them at a time that allows them to be routed to the required destination. The output signals from the output time switch stage are fed to an output frame switch 46 where they are routed to the appropriate channel combiner 44 (shown in FIG. 2) to form the output signal from the beam-forming processor.

As shown in FIG. 3, the beamformer comprises F core processors, each producing a set of beams for a particular frequency. Although the value of M is fixed for each processing block, it need not be the same for all of the F core processors. In addition, A is programmable and potentially different for all core processors. For example, a global beam covers the whole of the satellite coverage area that the satellite operator typically uses for signalling to the terminals for call initiation or termination. Since the beam covers all of the coverage area, it means that there can be no re-use of the frequencies used in that beam in other beams since they would overlap and interfere. This typically results in a large number of beams using the same frequency, each with a small number of elements, or a small number of beams (perhaps just one) that use many, or all, of the elements. In such a case, if the TDM length is less than the number of elements, then M=1 is sufficient. However, the value of A needs to be much larger for the processing block that forms the global beam because more elements are being used. A large amount of frequency re-use will tend to use fewer elements per beam and therefore A is smaller for the same M. For smaller amounts of frequency re-use, where more elements are used, A must be larger.

The use of a fixed number of weighting functions for a single frequency simplifies processing considerably as complications involving the sharing of resources (multiplication operations) between more than one frequency are avoided. It should be appreciated that it is possible to share the fixed number of weighting functions between a small number of frequencies or to use a multiple of the fixed number for a single frequency. By keeping the number fixed it is possible to implement a number of such functions with no interconnection required, which avoids complexity.

The channeliser 28 and beamformer 30 may be followed by demodulators to demodulate the digital signal, and the demodulated signal bits would then be converted into a data packet and routed to the appropriate destination which could be another subscriber link, cross link, or feeder link. The data packet gets routed and then the downlink process described above occurs which varies depending on what type of link is used, eg subscriber, cross, or feeder link).

As described earlier, the invention allows the use of a fixed number of weighting functions for each frequency. This can be used either for a large number of beams with a small number of elements contributing to each beam, or a small number of beams with a large number, or even all, of the elements contributing to each beam. Even though not all of the elements contribute to all of the beam coverage area, in most cases, there may be situations where a beam will use all of the elements. Again, as described earlier, since a global beam covers all of the coverage area, there can be no re-use of the frequencies used in that beam in other beams since they would overlap and interfere. This typically results in a large number of beams using the same frequency, each with a small number of elements, or a small number of beams (perhaps just one) using many, or all, of the elements.

In order to illustrate the reduction in complexity achieved by the system of the present invention, an example is given below.

A satellite has an antenna with 120 (N) elements and forms a total of 30 beams on each of 20 frequency bands. With a conventional digital beamformer where the beam weighting is applied to every element, the total number of weighting operations would be:

120×30×20=72,000.

With the beamformer of the present invention, if each beam is formed from no more than 24 elements, then the number of weighting operations is given by:

24×30×20=14,440.

This could be implemented by a beamformer with M=4 time switches selecting samples over the first A=6 time slots of each frame, so that there are 24 (A×M) elements per beam, 20 (F) frequency channels (one per frequency band) and a TDM length $L_{TDM}$ of 180 (30 beams×A=TDM length).

Figure 4:
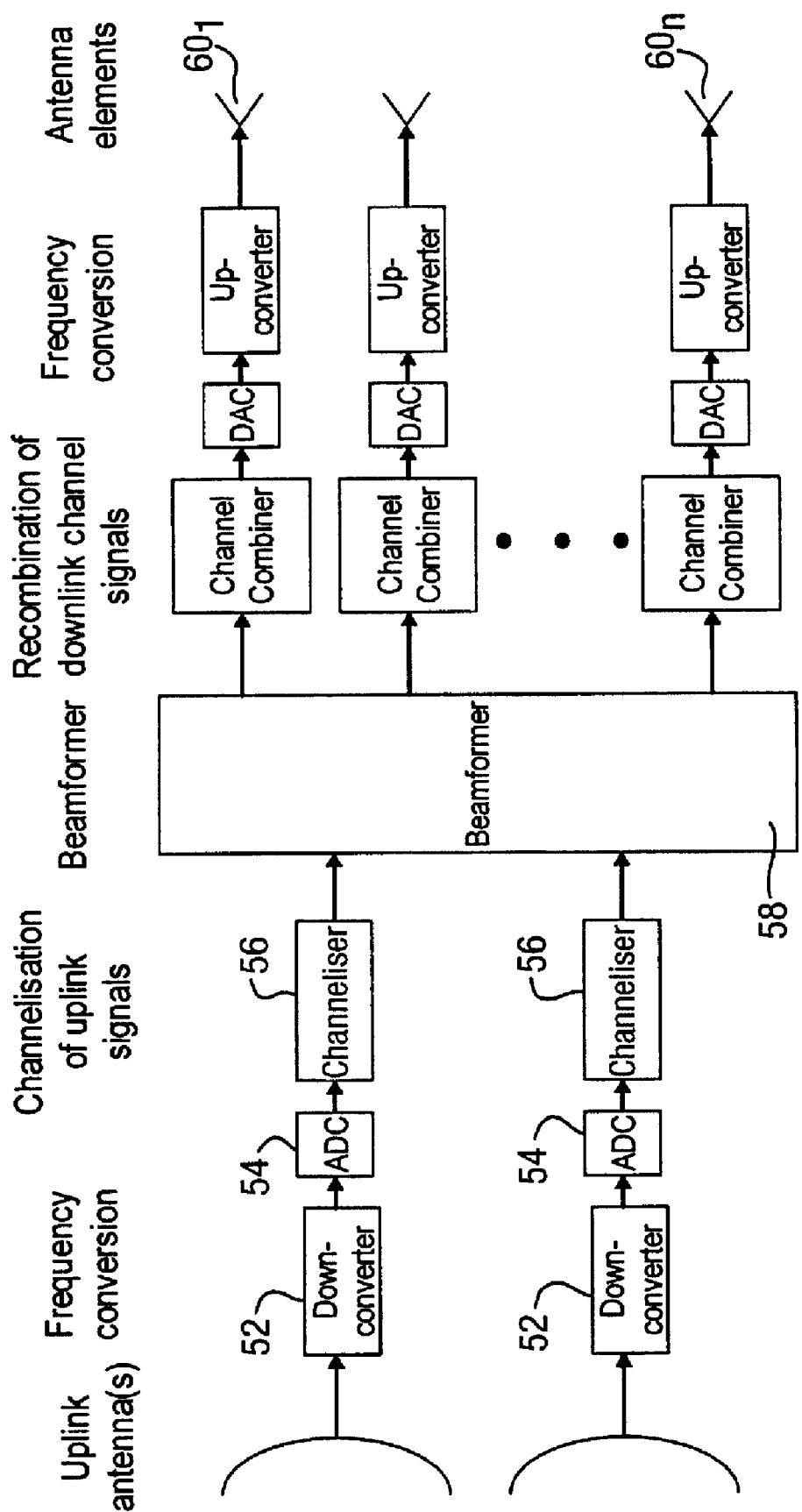
FIG. 4 is a block diagram representation of a transmit system including a beamforming system of the type illustrated in FIG. 3, for use in a satellite.

FIG. 4 shows a block diagram of a transmitter system 50 of a subscriber unit according to a preferred embodiment of the invention. The transmitter system comprises a down conversion mixer 52, where conversion of the RF transmit signal to an intermediate frequency (IF) is performed using respective signals from a local oscillator (not shown). The IF signal is then converted into a digital signal by A/D converter 54 fed into a channeliser 56 and then to beamformer 58. After beamforming, the beams are fed to a respective digital channel combiner where the composite digital signal containing the individual signals to be transmitted by each element of the antenna array is separated into a predetermined number, N, of digital channel signals. These channel signals are converted to analogue signals in a D/A converter and up-converted to RF before being transmitted by the respective element $60i \ldots 60n$ of antenna 60.

Transmit beamforming according to a preferred embodiment of the present invention will now be described, again with reference to FIG. 3. As described earlier, transmit beamforming involves the application of weighting coefficients to the transmit signal for each element of the array. The inputs to the beamformer 30 are the various channel signals to be transmitted, with all channel signals that are to be at a single frequency band at the array element outputs $60_1 \ldots 60_N$ being routed via an input frame switch 32 to a predetermined core processing block $34_1 \ldots 34_F$.

Within the appropriate processing block $34_1 \ldots 34_F$, the routed signals are replicated in a number of time switches $36_1 \ldots 36_M$, in a similar way to that described above in relation to the receive beam-former 30. In this instance, the number of switches M is a parameter depending on the number of beams that are formed on a single frequency from each element. Again, the signals are reordered as described above in relation to the receive beam-former.

For each sample in the TDM, all the signals from the time switches $36_1 \ldots 36_M$ that will contribute to the first antenna element $60_1$ are selected sequentially and fed to a set of multipliers $38_1 \ldots 38_M$ where they are weighted and then summed together in an adder 40. This is then repeated for the signals that contribute to each of the individual antenna elements $60_2 \ldots 60_N$. In this instance, summation of the weighted signals for each element facilitates frequency re-use rather than element combination, as in the receive beamforming described earlier.

If the number of beams on a single frequency that are to be transmitted on each element $60_1 \ldots 60_N$ exceeds the number of multiplication operations M performed on each TDM frame slot $L_{TDM}$, then accumulation over a period of A samples is required so a total A×M of weighted element signals are accumulated. This value of A is programmable and depends on the number of beams to be transmitted by each element $60_1 \ldots 60_N$. The output of this second stage of accumulation is a TDM containing the transmit signals for all of the array elements $60_1 \ldots 60_N$. The resultant TDM is fed to an output time switch 44 that is arranged to reorder the beam signals within the TDM. In this case, reordering of the signals ensures that the frequency signal can be routed to the appropriate element $60_1 \ldots 60_N$ so that, within any TDM frame slot, each element and each frequency cannot be replicated. The output signals from the output time switch stage 44 are fed to an output frame switch 46 where they are routed to the appropriate channel combiner to form the output signal from the beamforming processor.

Figure 5:
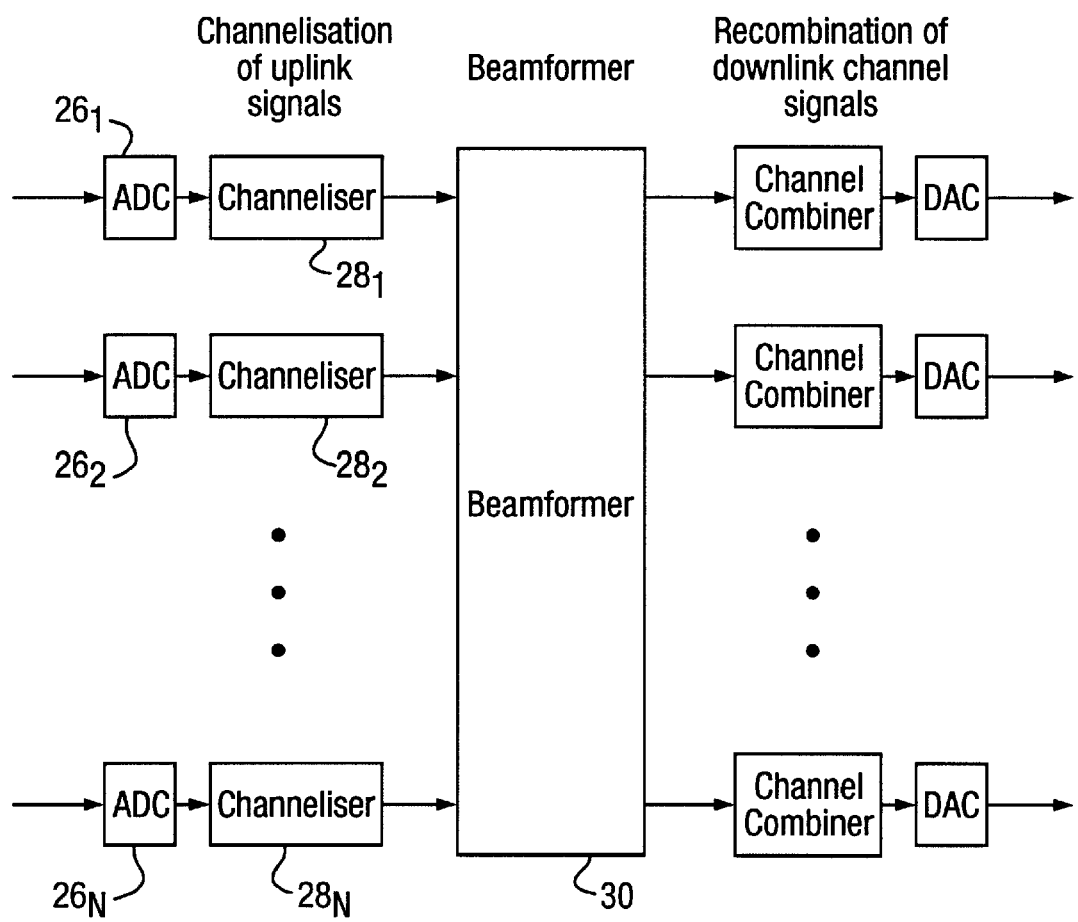
FIG. 5 is a block diagram representation of a beamforming system of the type illustrated in FIG. 3, that may be used in both receive and transmit systems.

Since the beamformer is identical for both receive and transmit beamforming, it is possible to implement a single DSP design, for example as shown in FIG. 5, that works for both transmit and receive beamforming. The number of inputs and outputs will depend on the type of beamforming (receive or transmit) but the structure of the DSP is identical. Hence, a single piece of DSP equipment can be used for either type of beamforming by changing only the number of inputs and outputs (or by activating the required number of inputs and outputs from a larger set). However, this implementation of a single DSP is only possible when the beamformer has the same input and output interfaces and operates with the same dataflow for both the receive and transmit cases.

It should be appreciated that the DSP may be used for both transmit and receive beamforming simultaneously. Some inputs will be from the antenna array and some from the feeder uplink while some outputs will be to the antenna array and some to the feeder downlink. The single beamformer in this case could be used for receive beamforming from the antenna array to the feeder link and transmit beamforming from the feeder link to the antenna array at the same time. However, beamforming will not occur on all inputs and all outputs and there will be no connections from beamformed inputs to beamformed outputs. Some of the F core processing blocks would be used for receive and some for transmit.

An alternative embodiment of the invention will now be described for receive beamforming and may be used when the TDM frame length is greater than the number of time slots A multiplied by the number of beams. Each core processing block is arranged to process the signals for more than one frequency band. For the earlier example, the TDM frame length was 180 (A×30 (the number of beams on same frequency)), then only a single frequency could be used. If however, the TDM frame length were 360, then two frequency bands could share a single core processor with one using the first half of the TDM frame and the other using the second half. In this instance, each time slot on multiple inputs to the input frame switch 32 must not contain the same frequency as any other input that will be routed to the same core processor.

For transmit beamforming, the equivalent condition is that the TDM frame length is greater than the number of time slots A multiplied by the number of elements. Each core processing block can then be used to produce the element signals on two or more frequency bands. It should be understood that any appropriate number of frequencies can be handled by a single core processor depending on the system parameters. In this instance, each time slot on multiple outputs from the output frame switch 46 must not contain the same frequency.

It also follows, for receive beamforming, that if the TDM frame length is less than the number of time slots required for a single frequency, e.g., 90 rather than 180, there would insufficient time to form all 30 beams within the frame since each beam takes A=6 TDM time slots. If the same input signals were fed to two core processors, each could form half of the beams for all of the elements. No extra weighting operations are involved, the only difference being partitioning of the operations between the core processors. For transmit beamforming, the complete set of beam signals to be transmitted is copied to two core processors each of which produces all of the beams for half of the elements. It should be understood that any appropriate number of core processors can be used to handle a single frequency, depending on the system parameters.

Figure 6:
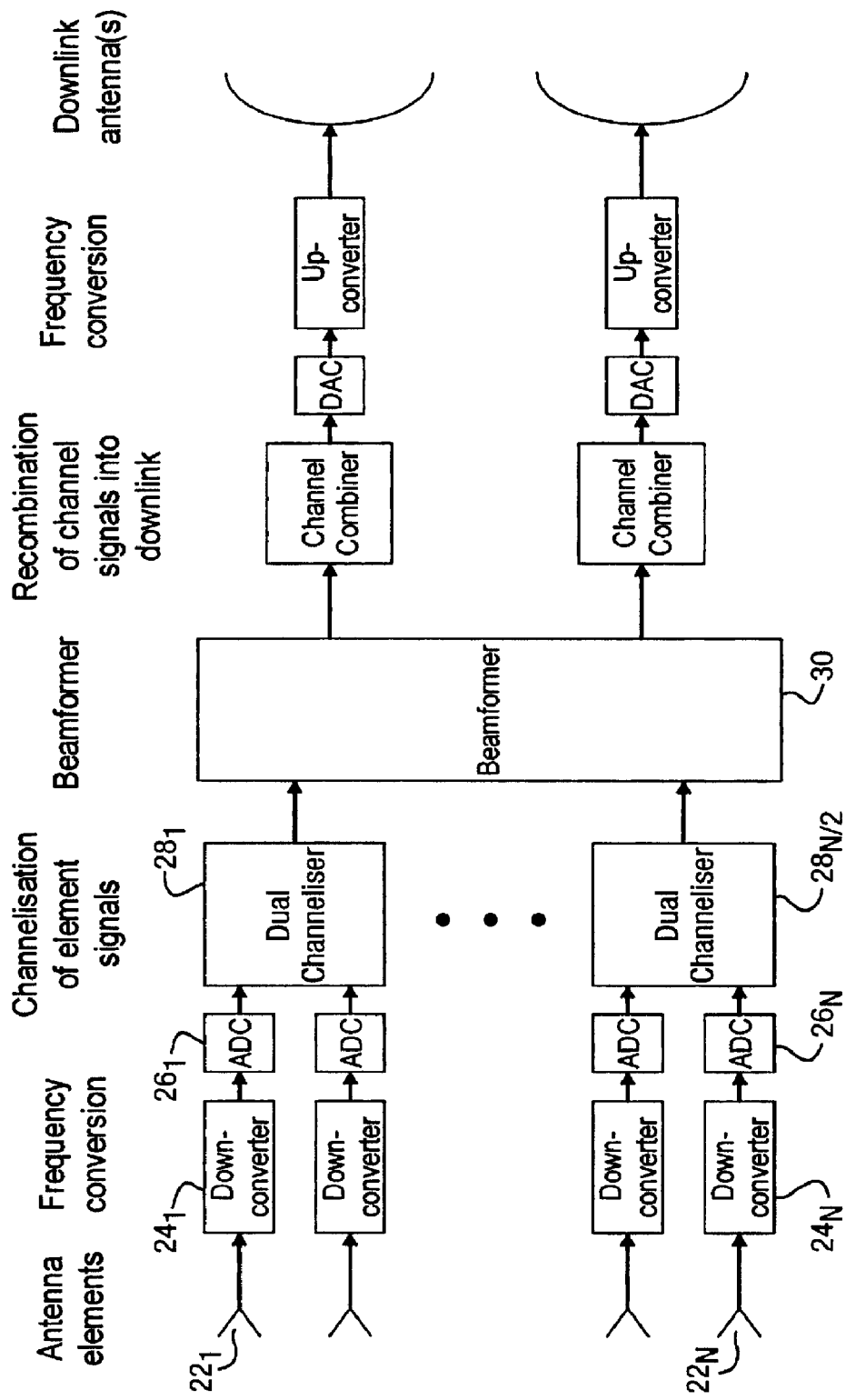
FIG. 6 is a block diagram representation of an alternative embodiment of the invention illustrating a receive beamforming system wherein each of the inputs to the beamforming system comes from two antenna elements.

Another embodiment of the invention is shown in FIG. 6, where a single beamformer is used. For receive beamforming, each of the N inputs to the input frame switch 32 comes from two elements rather than each from a single element, as shown in FIGS. 2 and 3. The signals from the two elements are fed to a dual channeliser where the various frequencies within their IF bandwidth are frequency segmented into fixed channel widths or bins in frequency, which are numbered 1 to N. This configuration will change the TDM constraints on the signals at the input frame switch 32 but the processing in the beamformer is identical. Instead of each time slot on multiple inputs not containing the same frequency from the same element, it must now not contain the same frequency from any of the group of elements connected to the same input. It is the combination of input source and core processor that must appear only once across the N inputs for each time slot. Although, in the embodiment illustrated, two elements are used per input to the input frame switch, it should be understood that any appropriate number of elements may be used per input. For transmit beamforming the outputs of the beamformer are routed to groups of elements rather than to single elements.

Another embodiment of the invention will be described with reference to FIG. 7. In this implementation, a number of beamformers are provided, each of the type shown in FIG. 3 but the complete set of core processor functions are not combined within the same input and output frame switches. For receive beamforming, each channeliser must route some of its signals to each of the beamformers but on the beamformer output there does not need to be any interconnection. For transmit beamforming, the inputs to the beamformers can come from individual sources but the outputs must be combined in the same channel combiner. Although only two beamformers are shown in FIG. 7, it should be understood that any appropriate number of beamformers can be used to handle the complete set of channels, depending on the system parameters. This implementation may be used when it is not possible to physically contain the required amount of arithmetic (multiply and accumulate stages) and storage (time switch stages) within a single physical block (an integrated circuit). Hence, multiple ICs can be used where each processes a fraction of the beamformed frequencies.

Another embodiment of the invention will now be described with reference to FIG. 8, wherein a number of beamformers are provided, each beamformer being used to process signals associated with a subset of the elements. If the capacity of the beamformer is insufficient to handle an array having a specific number of elements (for example, due to insufficient physical inputs), then there may be multiple elements per beamformer input.

For receive beamforming, in this instance, the N inputs to the frame switch 32 correspond to N different groups of antenna elements that share common processing. In the example described earlier of a satellite having an antenna with 120 elements forming a total of 30 beams on each of 20 frequency bands, half the elements for each beam are sent to a first beamformer while the other half are sent to a second beamformer. Instead of each beamformer performing 720 weightings for each frequency (24 elements per beam×30 beams), it performs 12 (max no. of elements per beam)×30 (no. of beams). The outputs of the two beamformers are then summed to give numerically the same result as for the original beamformer with the same number of weightings and minimal amount of external hardware. This requires a further stage of processing to combine multiple beamformer functions to process all of the elements. This embodiment requires replication of all the beamformer components, not just the core processing blocks. Each complete beamformer would be arranged to process signals for half of the antenna elements, the only combination being required is a summation, rather than a weighting which would be more complex to implement. For transmit beamforming, the input signals are replicated to the two beamformers and each beamformer processes all of the beams for half of the elements. The summation at the output is replaced by a duplication at the input.

It should be understood that although the time switching operation used to sequentially select the element signals for each beam to be formed complements the rest of the processing, there are many other ways that this operation could be performed. For example, instead of a TDM and a time switch, a crossbar (or other) switch could perform the rearrangement of the channels. In this case, the rearrangement is between different outputs rather than different time slots in the same output. This arrangement may be advantageous in an analogue implementation, due to the problems with forming a TDM in analogue.

It should also be understood that although, in the embodiments described above digital beamforming systems are used, the invention is equally applicable to analogue beamforming systems. In addition, the invention is also applicable to frequencies other than RF, for example, in sonar systems with audio frequencies.

The invention claimed is:

1. A beamforming system comprising:
an input switch configured to receive samples of a number of signals associated with a plurality of beamformed frequency bands, each sample containing a band of frequencies, and configured to route all sampled signals associated with the same beamformed frequency band to a predetermined processing block;
a selection stage configured to sequentially select a predetermined number of routed sampled signals according to predetermined criteria;
a weighting stage configured to apply a predetermined fixed number of weighting coefficients to the selected signals;
an accumulator configured to accumulate the weighted signals to form a composite signal, and
a switch arrangement configured to select said composite signal and routing said composite signal to an appropriate output.

2. A beamforming system according to claim 1, further comprising a plurality of antenna elements and wherein said received samples comprise composite signals from a number of beams received by each of, or by a number of, said plurality of antenna elements and wherein said routed signals are selected according to the beam to which they contribute.

3. A beamforming system according to claim 1, further comprising a plurality of antenna elements and wherein the received samples comprise signals from a number of beams to be transmitted by each of, or by a number of, said plurality of antenna elements and wherein the routed signals are selected according to the antenna element by which they will be transmitted.

4. A beamforming system according to claim 1, further comprising a plurality of antenna elements and wherein said received samples comprise composite signals from a number of beams received by each of, or by a number of, said plurality of antenna elements and wherein said routed signals are selected according to the beam to which they contribute and in dependence on the number of antenna elements and the number of elements per beam.

5. A beamforming system according to claim 1, further comprising a plurality of antenna elements and wherein the received samples comprise signals from a number of beams to be transmitted by each of, or by a number of, said plurality of antenna elements and wherein the routed signals are selected according to the antenna element by which they will be transmitted and in dependence on the number of beams that are to be formed on a single frequency from each antenna element.

6. A beamforming system according to claim 1, further comprising a plurality of antenna elements and wherein said received samples comprise composite signals from a number of beams received by each of, or by a number of, said plurality of antenna elements, wherein selection of the predetermined number (M) of signal samples is repeated a predetermined number of times (A) dependent on the number of elemental signals required to form a beam, a different set of M signal samples being selected in each of the A repetitions, and wherein the accumulator is configured to accumulate weighted signals over said A repetitions to form said composite signal.

7. A beamforming system according to claim 1, further comprising a plurality of antenna elements and wherein the received samples comprise signals from a number of beams to be transmitted by each of, or by a number of, said plurality of antenna elements, wherein selection of the predetermined number (M) of signal samples is repeated a predetermined number of times (A) dependent on the number of beams to be transmitted by each element, a different set of M signal samples being selected in each of the A repetitions, and wherein the accumulator is configured to accumulate weighted signals over said A repetitions to form said composite signal.

8. A beamforming system according to claim 1, further comprising a plurality of antenna elements and wherein said received samples comprise composite signals from a number of beams received by each of, or by a number of, said plurality antenna elements and wherein said routed signals are selected according to the beam to which they contribute, said system further comprising a number of processing blocks each producing a set of beams for a particular frequency band.

9. A beamforming system according to claim 1, further comprising a plurality of antenna elements and wherein the received samples comprise signals from a number of beams to be transmitted by each of, or by a number of, said plurality of antenna elements and wherein the routed signals are selected according to the antenna element by which they will be transmitted, said system further comprising a number of processing blocks each producing a set of antenna element signals for a particular frequency band.

10. A beamforming system according to claim 1, further comprising a plurality of antenna elements and wherein said received samples comprise composite signals from a number of beams received or to be transmitted by each of, or by a number of, said plurality antenna elements and wherein said routed signals are selected according to the beam to which they contribute or according to the antenna element by which they will be transmitted, said system further comprising a number of processing blocks each producing a set of beams, or a set of antenna element signals for a particular frequency band, and wherein the predetermined number of routed sampled signals selected is different in one or more of the processing blocks.

11. A beamforming system according to claim 1, further comprising a plurality of antenna elements and wherein said received samples comprise composite signals from a number of beams received or to be transmitted by each of, or by a number of, said plurality antenna elements and wherein said routed signals are selected according to the beam to which they contribute or according to the antenna element by which they will be transmitted, said system further comprising a number of processing blocks each producing a set of beams or a set of antenna element signals for a particular frequency band and wherein the predetermined fixed number of weighting coefficients applied to the selected signals is different in one or more of the processing blocks.

12. A beamforming system according to claim 1, wherein the input switch is arranged to receive a stream of TDM frames of signal samples and to apply a different switching function to each time slot of each TDM frame.

13. A beamforming system according to claim 1, wherein the input switch is arranged to route all sampled signals associated with a number of frequency bands to the predetermined processing block.

14. A beamforming system according to claim 1, wherein the input switch is arranged to route all sampled signals associated with the same beamformed frequency band to a number of processing blocks.

15. A number of beamforming systems according to claim 1, wherein each beamforming system processes a subset of the complete set of beamformed frequency bands such that all beamformed frequency bands are processed by the complete set of beamforming systems.

16. A number of beamforming systems according to claim 1, wherein the input switch of each beamforming system is arranged to receive sampled signals from a number of beams received by a predetermined subset of a number of antenna elements and further comprising a combiner for combining the outputs of each beamforming system.

17. A number of beamforming systems according to claim 1, wherein the input switch of each beamforming system is arranged to receive identical samples of a number of signals for multiple beams and wherein each beamforming system is arranged to process the beams to be transmitted by a subset of antenna elements.

18. A beamforming system according to claim 1, wherein the received samples comprise composite signals from a number of beams received by a number of antenna elements and wherein the routed signals are selected according to the beam to which they contribute.

19. A beamforming system according to claim 1, wherein the received samples comprise signals from a number of beams to be transmitted by a number of antenna elements and wherein the routed signals are selected according to the antenna element by which they will be transmitted.

20. A beamforming system according to claim 1, the system being adapted to process both transmit and receive channel signals in a single digital processor.

21. A beamforming system according to claim 20, wherein the system is adapted to process both transmit and receive channel signals simultaneously.

22. A method of beamforming comprising the steps of:
(a) receiving samples of a number of signals associated with a plurality of beamformed frequency bands, each sample containing a band of frequencies;
(b) routing all sampled signals associated with the same beamformed frequency band to a predetermined processing block;
(c) selecting sequentially a predetermined number of routed sampled signals according to predetermined criteria;
(d) applying a predetermined fixed number of weighting coefficients to the selected signals;
(e) accumulating the weighted signals to form a composite signal;
repeating steps (c) to (e) a predetermined number of times to form a plurality of composite signals, and
(f) selecting a composite signal from said plurality of composite signals and routing said composite signal to an appropriate output.

23. A method of beamforming according to claim 22 wherein step (a) comprises receiving samples of composite signals from a number of beams received by a number of antenna elements and wherein step (c) comprises selecting signals according to the beam to which they contribute.

24. A method of beamforming according to claim 22, wherein step (a) comprises receiving samples of signals from a number of beams to be transmitted by a number of antenna elements and wherein step (c) comprises selecting signals according to the antenna element by which they will be transmitted.

25. A receive beamforming system comprising:
input means for receiving samples of composite signals from a number of beams received by a number of antenna elements, the composite signals being associated with a plurality of beamformed frequency bands and each sample containing a band of frequencies;
switching means for routing all sampled signals associated with the same beamformed frequency band to a predetermined processing block;
means for sequentially selecting a predetermined number of routed sampled signals according to the beam to which they contribute;
weighting means for applying a predetermined fixed number of weighting coefficients to the selected signals;
means for accumulating the weighted signals to form a composite signal, and means for selecting said composite signal and routing said composite signal to an appropriate output.

26. A transmit beamforming system comprising:
input means for receiving samples of signals from a number of beams to be transmitted by a number of antenna elements, the signals being associated with a plurality of beamformed frequency bands and each sample containing a band of frequencies;
switching means for routing all sampled signals associated with the same beamformed frequency band to a predetermined processing block;

means for sequentially selecting a predetermined number of routed sampled signals according to the antenna element by which they will be transmitted; weighting means for applying a predetermined fixed number of weighting coefficients to the selected signals; means for accumulating the weighted signals to form a composite signal, and means for selecting said composite signal and routing said composite signal to an appropriate output.

* * * * *